(12) United States Patent
Bardini

(10) Patent No.: US 7,046,670 B2
(45) Date of Patent: May 16, 2006

(54) METHOD AND SYSTEM FOR SYNCHRONIZING ISOCHRONOUS DATA ON TRANSMIT OVER THE IEEE 1394 BUS FROM CONTENT UNAWARE DEVICES

(75) Inventor: Richard Bardini, Los Gatos, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 892 days.

(21) Appl. No.: 09/823,138

(22) Filed: Mar. 30, 2001

(65) Prior Publication Data
US 2002/0141439 A1    Oct. 3, 2002

(51) Int. Cl.
*H04J 3/06* (2006.01)

(52) U.S. Cl. ...................... 370/394; 370/503
(58) Field of Classification Search ................ 370/231, 370/235, 389, 394, 474, 489, 490, 503, 509, 370/510, 512, 514
See application file for complete search history.

(56) References Cited

U.S. PATENT DOCUMENTS 6,414,971 B1 * 7/2002 James et al. ............... 370/519
6,434,146 B1 * 8/2002 Movshovich et al. ....... 370/394
6,593,937 B1 * 7/2003 Ludtke et al. .............. 345/629
6,687,264 B1 * 2/2004 Yoon et al. ................. 370/490
2004/0125825 A1 * 7/2004 Lym et al. ................... 370/519

FOREIGN PATENT DOCUMENTS

EP    1087581 A2 *  3/2001

* cited by examiner

*Primary Examiner*—Chi Pham
*Assistant Examiner*—Anh-Vu Ly
(74) *Attorney, Agent, or Firm*—Charles J. Kulas; Trellis Intellectual Property Law Group, PC

(57) ABSTRACT

The present invention generally relates to synchronization of isochronous data. More specifically, the present invention relates to method and system for synchronizing isochronous data on transmit over IEEE 1394 bus from content unaware devices. In an exemplary embodiment, the system includes an isochronous data processor (IDP) which is controlled by a firmware control. The IDP receives data packets from a device and inserts a data marker at the beginning of each packet. Each data marker and the associated packet are then stored onto a hard disk. When data are retrieved from the hard disk, the IDP uses the data markers to synchronize data delivery to a requesting device so that data delivery is started on a packet which represents the start of a frame. In the event that a packet within the data stream is corrupted, the IDP also uses the data markers to re-synchronize data delivery so that data delivery is re-initiated on a packet which represents the start of the next frame.

21 Claims, 6 Drawing Sheets

METHOD AND SYSTEM FOR SYNCHRONIZING ISOCHRONOUS DATA ON TRANSMIT OVER THE IEEE 1394 BUS FROM CONTENT UNAWARE DEVICES

FIELD OF THE INVENTION

The present invention generally relates to synchronization of isochronous data. More specifically, the present invention relates to a method and system for synchronizing isochronous data on transmit over IEEE 1394 bus from content unaware devices.

BACKGROUND OF THE INVENTION

With the proliferation of digital audio and video devices, it has become necessary to establish a high speed serial communication mechanism that is capable of allowing efficient and fast transfer of audio/video (A/V) data between devices. IEEE 1394 has so far been a successful candidate for this purpose.

The transmission of A/V data using industry standard such as IEEE 1394 is well known. While the speedy transmission of A/V data over an IEEE 1394 bus is important, the efficient retrieval and display of A/V data by modern computing devices, such as a set top box, is also becoming an important issue. For example, when A/V data are requested from a storage medium, such as a hard disk, for display by a set top box, the time it takes to display the retrieved A/V data is critical. Regardless of how fast the A/V data can be transmitted over the IEEE 1394 bus, the retrieved A/V data do not serve their ultimate purpose if such data cannot be displayed promptly by the set top box.

Under the IEEE 1394 standard, A/V or isochronous data are organized and stored as individual packets. A number of packets are then grouped together to form a frame. When A/V data in 1394 format are displayed, the displaying device displays the A/V data one frame at a time. All the packets within a frame are collected first before a frame is displayed. As a result, in order to display a frame, the start of the frame or frame boundary need to be located. However, when a displaying device receives the retrieved A/V data from a storage medium, the beginning of such data do not necessarily, and in fact often do not, begin with a frame boundary. This is because a hard disk, for example, typically only delivers data on disk sector boundaries. As a result, the initial data delivered by the hard disk may not correspond to a frame boundary. Furthermore, data corresponding to the frame boundary may be lost due to bad or lost disk sectors or other reasons.

In addition, when partial frames are delivered to certain displaying devices, such devices may not be robust enough or have sufficient capability to handle partial frames. Consequently, such devices may not be able to display any A/V data at all. Hence, it is often necessary to locate or synchronize to the next available frame boundary before the data can be displayed. Therefore, it would be desirable to provide a method and system to efficiently synchronize the retrieved A/V data to a frame boundary so as to allow such data to be displayed more promptly.

SUMMARY OF THE INVENTION

In an exemplary embodiment, a system for synchronizing isochronous data packets for delivery to a device is provided. The system includes an isochronous data processor, a firmware control and a storage medium. More specifically, the isochronous data processor is configured to process isochronous data packets. The isochronous data processor inserts a data marker at beginning of each of the isochronous data packets. The firmware control is configured to control the operation of the isochronous data processor. And, the storage medium is provided for storing the data markers and their associated isochronous data packets.

During operation, the isochronous data processor receives isochronous data packets from a device and inserts a data marker at the beginning of each packet. Each data marker and the associated packet are then stored onto a storage medium, such as a hard disk. When data are retrieved from the hard disk, the isochronous data processor uses the data markers to synchronize data delivery to a requesting device so that data delivery is started on a packet which represents the start of a frame. Furthermore, in the event that a packet within the data stream is corrupted, the isochronous also uses the data markers to re-synchronize data delivery so that data delivery is re-initiated on a packet which represents the start of the next frame.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

DESCRIPTION OF THE SPECIFIC EMBODIMENTS

Figure 1:
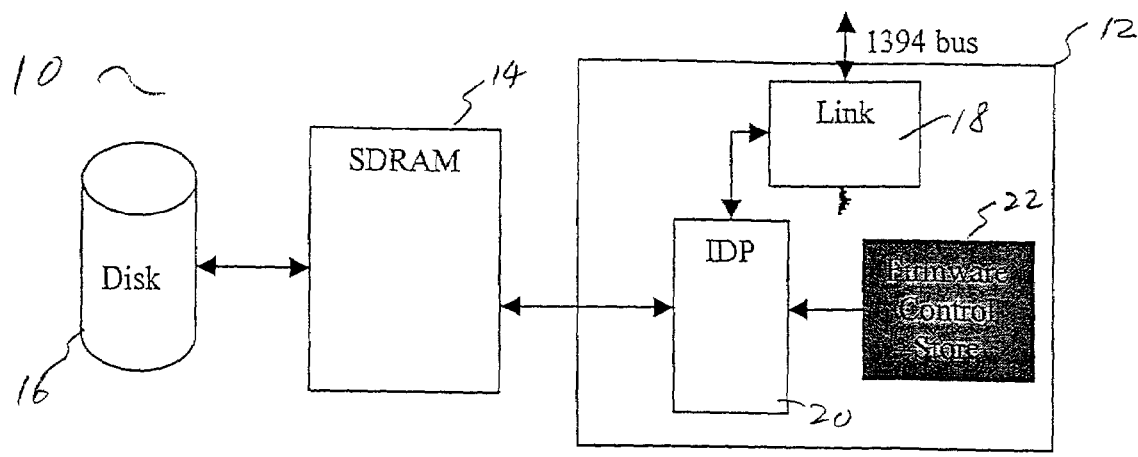
FIG. 1 is a simplified functional block diagram showing an exemplary embodiment in accordance with the present invention.

Various embodiments of the present invention will now be described. FIG. 1 is a simplified functional block diagram showing an exemplary embodiment of the present invention. Referring to FIG. 1, according to an exemplary embodiment, the system 10 includes a data processor 12, a memory buffer 14 (implemented in SDRAM), and a hard disk 16. The data processor 12 further includes an 1394 interface 18, an isochronous data processor (IDP) 20 and firmware 22 which controls the IDP.

According to this exemplary embodiment, the system 10 generally operates as follows. Data, typically formatted according to the 1394 specification, are received by the data processor 12 via the 1394 interface 18. The 1394 interface 18, in turn, determines whether the data are A/V (isochronous) data or asynchronous data. If the data are asynchronous data, then they are routed to an asynchronous data processor (not shown). On the other hand, if the data are isochronous data, then the 1394 interface 18 routes such data to the IDP 20 for processing.

The IDP 20 processes the data under the control of the firmware 22. Preferably, the firmware 22 is implemented via software using a computer programming language such as C and C++. However, it should be apparent to one skilled in the art that other computer programming languages can be used to implement the firmware 22. Once the data are processed, the IDP 20 transmits them to the memory buffer 14. The memory buffer 14, in turn, transmits the processed data to the hard disk 16 for storage. Subsequently, the processed data can then be retrieved by other devices from the hard disk 16 for display. The processed data, as will be described in further detail below, allows a requesting device to synchronize the retrieved data to the frame boundary.

Figure 2:
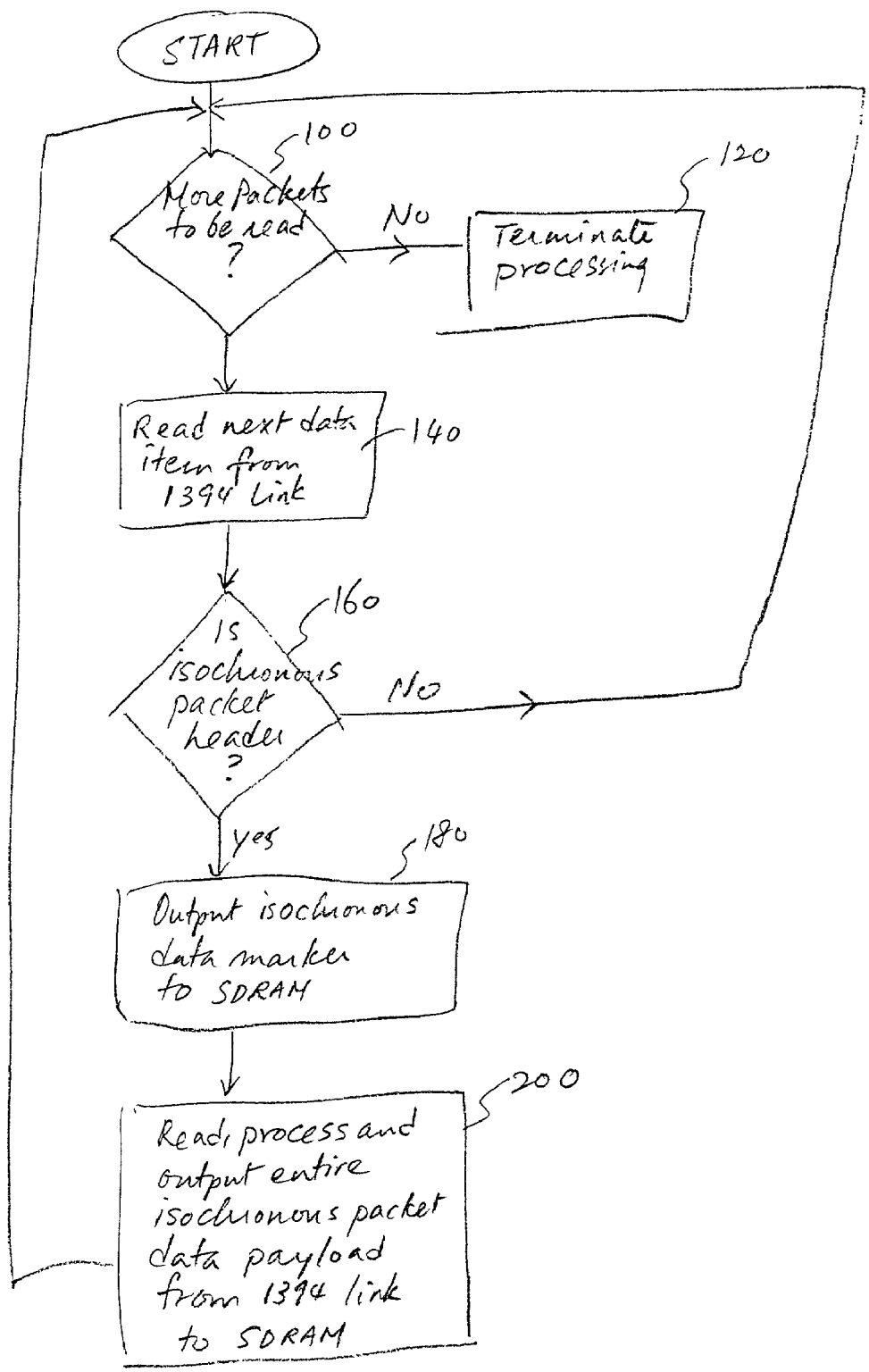
FIG. 2 is a simplified flow diagram illustrating insertion of a data marker into a packet in accordance with the present invention.

The IDP 20 processes the incoming isochronous data under the control and direction of the firmware 22. More specifically, the isochronous data are received in the form of packets. A special data marker is inserted into each packet before the packet is stored onto the hard disk. FIG. 2 illustrates the process of inserting a data marker into a packet.

As shown in FIG. 2, at 100, the IDP 20 checks to determine whether there are more packets to be processed. In making this determination, the IDP 20 depends on external signals received from within/without the system 10. For example, if an end-of-file signal is received by the IDP 20, then packet processing is halted.

If there are no more packets, at 120, the IDP 20 terminates processing. Otherwise, at 140, the next data item is routed from the 1394 interface 18 to the IDP 20.

Figure 3:
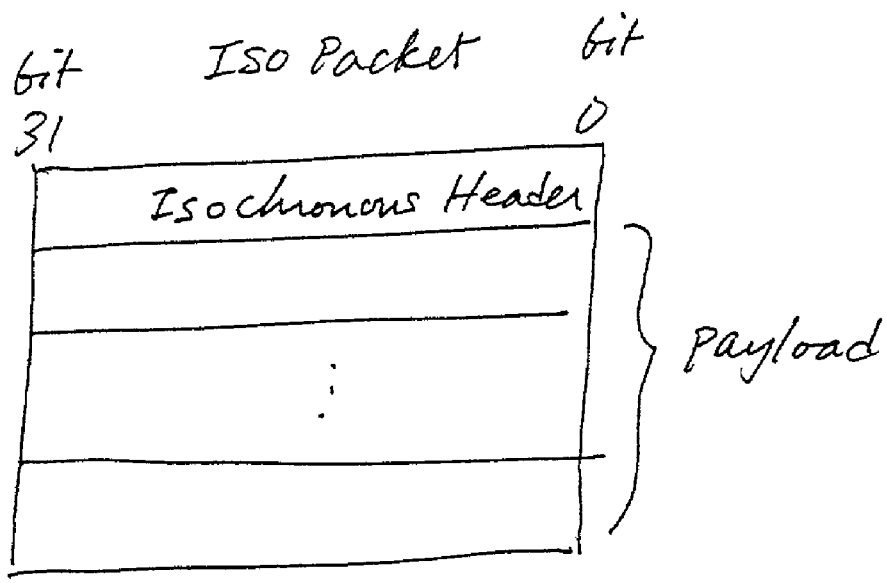
FIG. 3 is a simplified schematic diagram illustrating a packet according to the 1394 specification.

Under the 1394 specification, a packet is further broken down into 32-bit data items. FIG. 3 is a simplified schematic diagram illustrating a packet according to the 1394 specification. The first 32-bit data item of a packet is an isochronous header. The isochronous header, more specifically, the upper 16 bits of the isochronous header, contains information relating to the length of the entire packet. The remaining 32-bit data items following the isochronous header collectively form the payload which contains data belonging to that packet. According to the 1394 specification, data are transmitted over a 1394 bus 32 bits at a time with a transmission interval of 125 μsec. More specifically, the entire payload of a 1394 packet, whose length as specified in the isochronous header, is always transmitted within a 125-μsec interval. Depending on the transmission rate, a faster 1394 bus transmission rate may allow additional bandwidth to accommodate other isochronous packets from other data streams thereby permitting such other packets to be transmitted within the same 125-μsec interval.

At 160, the data item received from the 1394 interface 18 is checked to determine whether that data item is an isochronous header.

At 180, if the data item is an isochronous header, then the IDP 20 generates a data marker and outputs it to the memory buffer 14. Preferably, the data marker is a 32-bit data item which has been configured to identify it as such. Next, the isochronous header is also routed to the memory buffer 14.

At 200, using payload information obtained from the isochronous header, the entire payload of the packet is collected and routed to the memory buffer 14. That is, all the remaining 32-bit data items, excluding the isochronous header, within a packet are processed and outputted to the memory buffer 14. The foregoing process is repeated at 100 until all the packets are processed.

Figure 4:
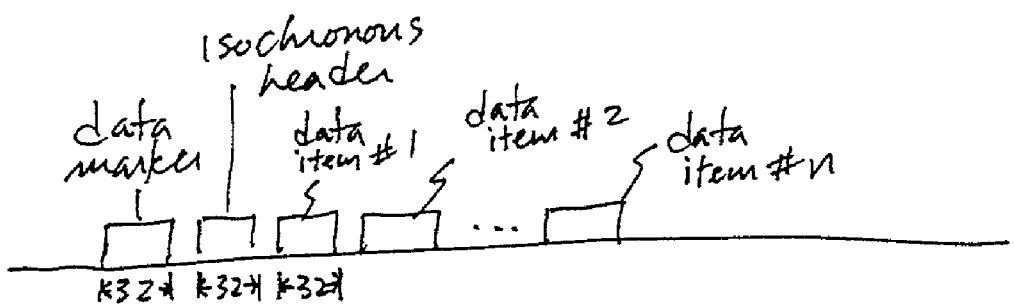
FIG. 4 is a simplified schematic diagram showing a portion of the data stored in a memory buffer in accordance with the present invention.

As a result, the memory buffer 14 contains a number of data items with data markers inserted at the appropriate locations in sequential order. FIG. 4 is a simplified schematic diagram showing a portion of the data stored in the memory buffer 14. As shown in FIG. 4, for each packet, a data marker precedes the isochronous header. The isochronous header is then followed by a number of data items which collectively represent the payload of the packet. Preferably, data in the memory buffer 14 are periodically stored or downloaded onto the hard disk 16 in a sequential manner.

Figure 5:
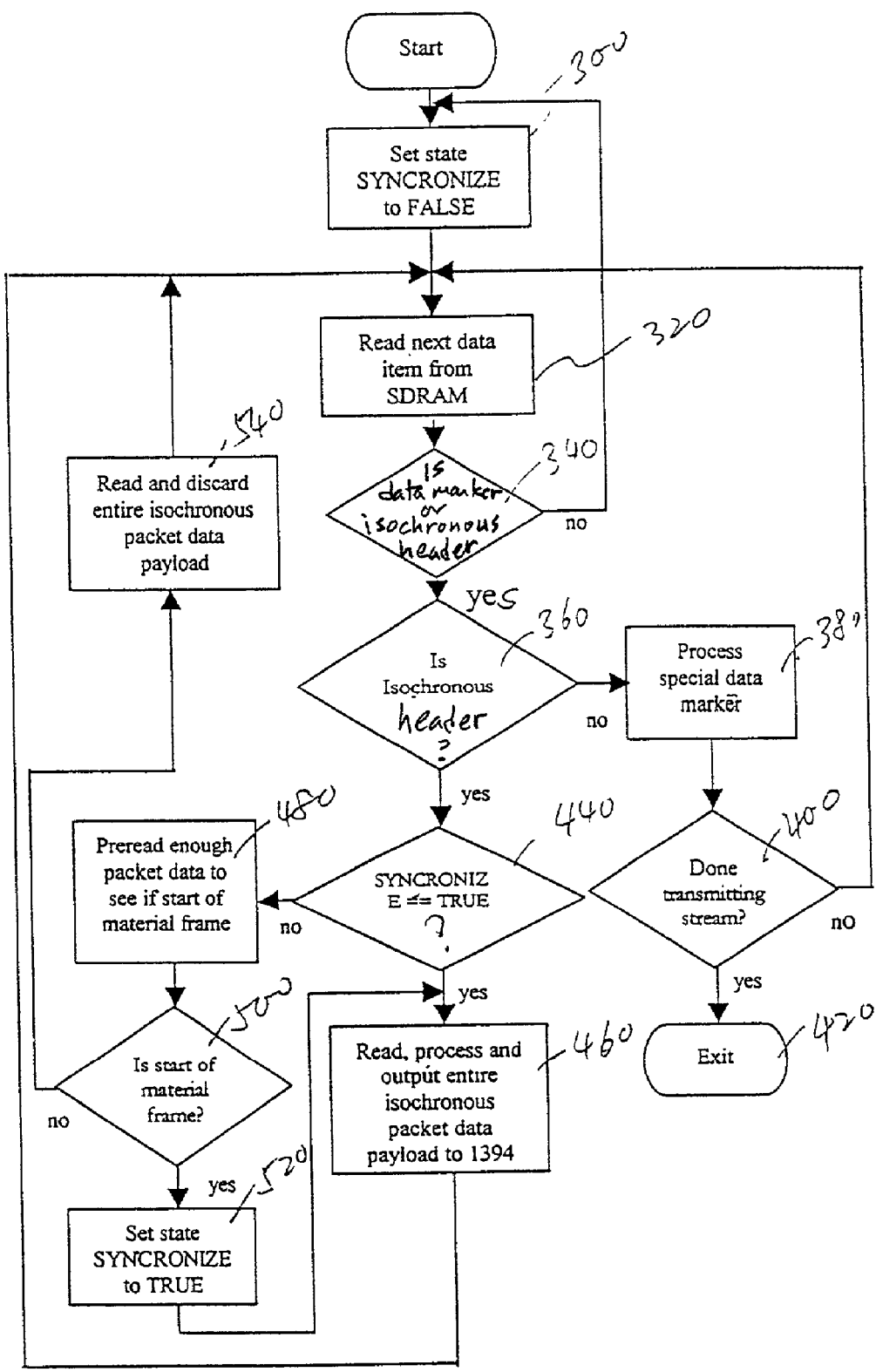
FIG. 5 is a simplified flow diagram illustrating how data processed in accordance with an embodiment of the present invention facilitate synchronization or resynchronization.

The processed data, now stored on the hard disk 16, allows a requesting device to synchronize/resynchronize the retrieved data more efficiently. FIG. 5 is a simplified flow diagram illustrating how data processed using an embodiment of the present invention facilitate synchronization or resynchronization. Upon request, desired data stored on the hard disk 16 are retrieved and transmitted to the memory buffer 14, where the data await further processing by the data processor 12, or more specifically, by the IDP 20.

Referring to FIG. 5, at 300, the value of a state indicator, which indicates whether the retrieved data have been synchronized, is initially set to "FALSE." At 320, the IDP 20 reads a 32-bit data item from the memory buffer 14.

At 340, the IDP 20 checks the retrieved 32-bit data item to determine whether the data item is either a data marker or an isochronous header. If the retrieved 32-bit data item is neither a data marker nor an isochronous header, then the data item is discarded and control is passed back to 300 where the value of the state indicator is set to "FALSE."

On the other hand, if the retrieved 32-bit data item is either a data marker or an isochronous header, then, at 360, the data item is further checked to determine whether such data item is a data marker or isochronous header.

At 380, if the data item is a data marker, then the IDP 20 processes the data marker and uses this information to synchronize data transmission. More specifically, upon detecting the data marker, the IDP 20 signals to the system 10 that the next packet is to be transmitted on the next 125-μsec cycle.

At 400, the IDP 20 determines whether data transmission should continue. In making this determination, the IDP 20 relies on external signals received from within/without the system 10. For example, when a stop transmission signal is received from a requesting device, then the IDP 20 will accordingly terminate data transmission.

If the IDP 20 determines that data transmission should continue, then the next 32-bit data item is read at 320. Otherwise, at 420, the IDP 20 terminates the requested data transmission.

At 440, if the data item is an isochronous header, then the state indicator is checked to determine whether the state indicator is "TRUE." A value of "TRUE" shown by the state indicator indicates that data transmission is already synchronized to the start of a frame. As noted previously, for isochronous (or A/V) data, a number of packets make up a frame.

At 460, if the state indicator shows a value of "TRUE," then, using payload information available from the isochronous header, the IDP 20 reads and processes the remaining data items representing the payload and outputs the entire packet to the intended requesting device. Processing for the next packet then continues at 320.

At 480, if the state indicator does not show a value of "TRUE" (i.e., it shows value of "FALSE"), then the IDP 20 prereads and processes a sufficient number of data items within the packet in order to detect the start of a frame. By examining the contents of the preread data items, the IDP 20 is able to make a determination as to whether the packet represents the start of a frame. It is to be understood that the start of a frame may be represented in different formats in the data items depending on the formats and specifications chosen for data transmission and communication. It should be apparent to a person of ordinary skill in the art who is familiar with the various formats and specifications available for data transmission and communication how the start of a frame may be represented.

At 500, if it is determined from the preread data items that the packet does not represent the start of a frame, then all the data items within that packet are not transmitted but are, instead, discarded. Processing for the next packet then continues at 320.

At 520, if it is determined from the preread data items that the packet represents the start of a frame, then the value of the state indicator is set to "TRUE" indicating that the start of a frame has been located. Processing for the packet then continues at 460.

Figure 6:
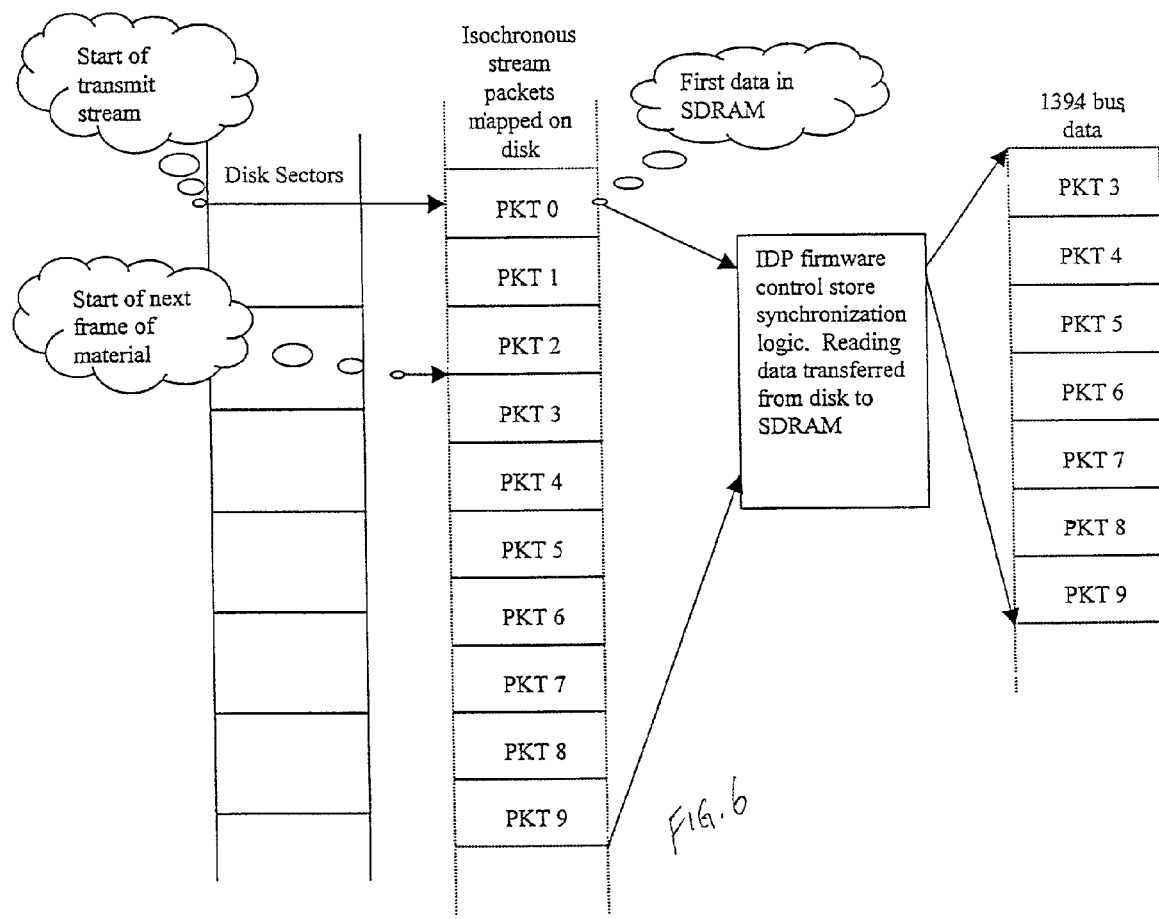
FIG. 6 is a simplified diagram illustrating a first example of the operation of an exemplary embodiment in accordance with the present invention.
Figure 7:
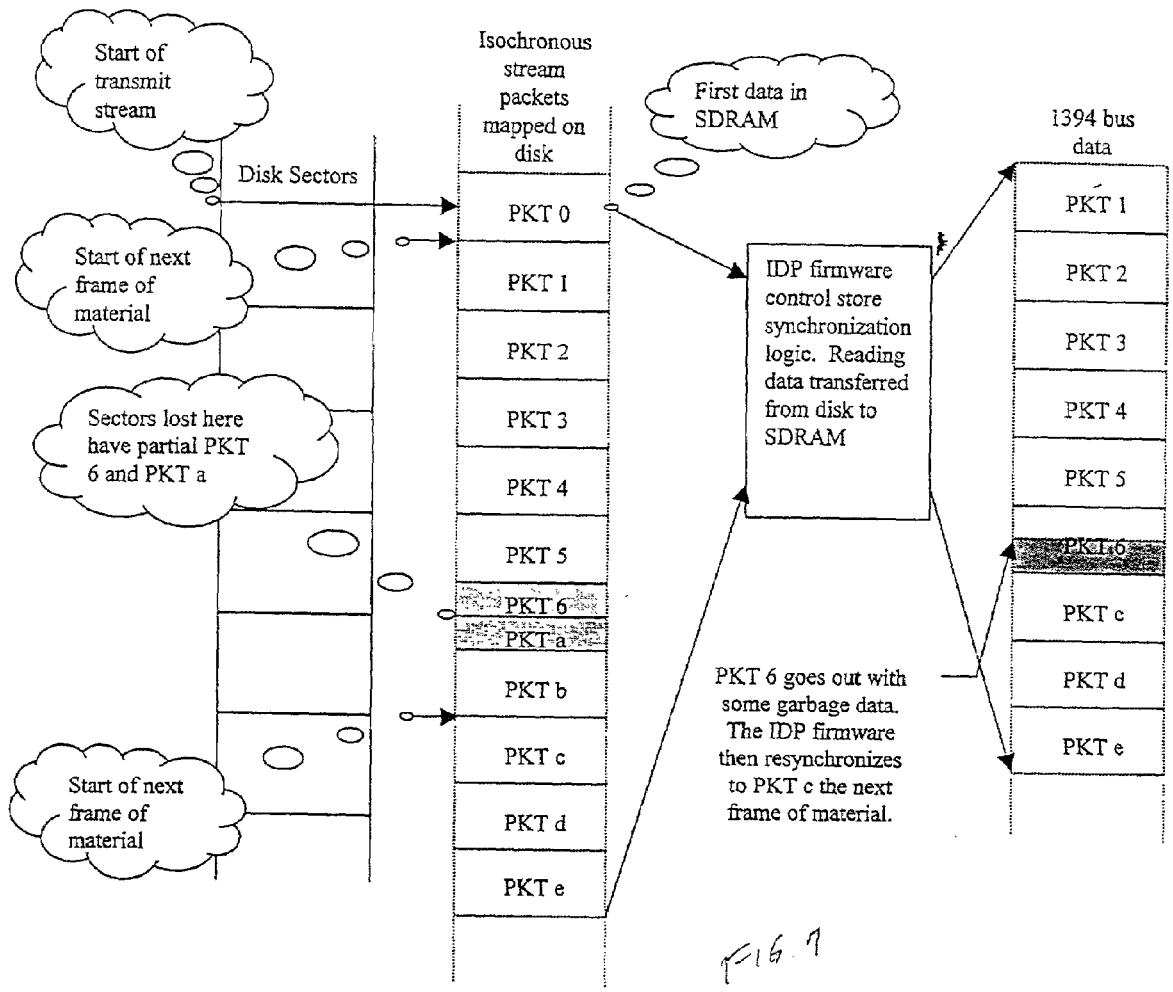
FIG. 7 is a simplified diagram illustrating a second example of the operation of an exemplary embodiment in accordance with the present invention.

The operation of the exemplary embodiment is further illustrated by FIGS. 6 and 7. Referring to FIG. 6, the IDP 20 identifies the start of a frame and starts data delivery on the packet which corresponds to that frame. More specifically, a number of packets PKT0–PKT9 are read from the hard disk 16. Packet PKT0 represents the beginning of the data stream and packet PKT3 represents the start of a frame. The frame includes packets PKT3–PKT9. The IDP 20 processes packets PKT0–PKT9.

Referring back to FIG. 5, the state indicator is initially set to "FALSE." When the first data item for packet PKT0 is read, assuming that it contains a valid data marker or isochronous header, the state indicator is checked at 440. At this point, the state indicator is still set to "FALSE." Hence, at 480, additional data items for packet PKT0 are read. At 500, the additional data items are examined to determine if packet PKTO represents the start of a frame. Since PKTO does not represent the start of a frame, the entire packet is discarded at 540. The process then continues at 320. Since packets PKT1 and PKT2 also do not represent the start of a frame, the state indicator remains to be "FALSE" and the packets PKT1 and PKT2 are similarly discarded.

However, when packet PKT3 is encountered, at 500, it is determined that packet PKT3 represents the start of a frame. As a result, at 520, the state indicator is set to "TRUE" and the entire packet is then outputted at 460. The process then continues at 320 for the next packet PKT4. Since the state indicator has now been set to "TRUE," the check condition at 440 is now true. Then, at 460, the entire packet is outputted. Likewise, packets PKT5–PKT9 are also outputted.

To summarize, the IDP 20 identifies the start of the frame which is located at packet PKT3. Since the start of the frame is located at packet PKT3, packets PKT0–PKT2 are discarded or filtered by the IDP 20. As a result, the IDP 20 only transmits packets PKT3–PKT9 to the requesting device. By delivering packets from the start of a frame, the requesting device is then able to process and display the data more quickly without having to locate the start of a frame.

Referring to FIG. 7, when a packet within the data stream is corrupted, the IDP 20 identifies the start of the next frame and begins data delivery on the packet which corresponds to that frame. More specifically, a number of packets PKT0–PKTe are read from the hard disk 16. PKT1 represents the beginning of a first frame. The first frame includes packets PKT1–PKTb. PKTc represents the beginning of a second frame. The second frame includes packets PKTc–PKTe. During transmission from the hard disk 16, packet PKT6 is corrupted.

Referring back to FIG. 5, the IDP 20 processes the data stream as follows. As described above, the IDP 20 first identifies the start of the first frame which is located at packet PKT1 and begins delivery starting with that packet PKT1. Similarly, packets PKT2–PKT5 are outputted.

However, when a partially corrupted packet PKT6 is detected at 340, the IDP 20 discards the remaining portion of partially corrupted packet PKT6 and resets the state indicator to "FALSE" at 300. Resetting the state indicator to "FALSE" indicates that the data stream is no longer synchronized. Hence, when packets PKTa and PKTb are read, they are discarded as described above since they do not represent the start of a frame.

When packet PKTc is encountered, since it represents the start of a frame, the state indicator is set to "TRUE" at 520 and the entire is outputted at 460. Now that the state indicator has been set to "TRUE," packets PKTd and PKTe are similarly outputted at 460.

To summarize, when the IDP 20 detects that packet PKT6 is partially corrupted, it looks for the start of the next frame which is located at packet PKTc and reinitiates data delivery from that packet. Since data delivery is reinitiated starting with packet PKTc, packets PKTa and PKTb are discarded or filtered by the IDP 20. As a result, only packets PKTc–PKTe are delivered to the requesting device. By delivering packets from the start of the next frame, the requesting device is then able to process and display the data more quickly without having to process corrupted data and locate the start of the next frame.

It should be understood that a person of ordinary skill in the art should be familiar with the 1394 specification so as to implement and carry out the present invention as described herein. It should be further understood that the present invention as described herein is not limited to the 1394 specification. Based on the teachings provided herein, it should be apparent to one of ordinary skill in the art that the present invention can easily be applied to other data format specifications.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for synchronizing isochronous packets for delivery to a device, the system comprising:

an isochronous data processor configured to process said isochronous packets, said isochronous data processor inserts a data marker at beginning of each of said isochronous packets;

a firmware control configured to control operation of said isochronous data processor; and a storage medium for storing said data markers and their associated isochronous packets, wherein said isochronous data processor uses said data marker to re-synchronize data delivery to said device when said data delivery contains a corrupted packet;

in response to a request for delivery of the stored packets, said firmware control to synchronize the data delivery by discarding packets acquired from said storage medium until a packet that defines a frame boundary is located and then delivering packets to the device.

2. The system according to claim 1, wherein said data delivery is re-synchronized in that said data delivery begins with an isochronous packet which corresponds to a next frame boundary.

3. The system according to claim 1, wherein said isochronous packets are transmitted in accordance with IEEE 1394 specification.

4. The system according to claim 1, wherein upon retrieving data markers from said storage medium, said isochronous data processor uses said data marker to synchronize data delivery to said device.

5. The system according to claim 4, wherein said data delivery is synchronized in that said data delivery begins with an isochronous packet that corresponds to a frame boundary.

6. The system according to claim 1, wherein a record is stored in a buffer in the following order: the data marker, an isochronous header, and a plurality of data items.

7. The system according to claim 6, wherein the record is stored on a hard disk.

8. The system according to claim 1, wherein the data marker is used to locate the start of a frame.

9. The system according to claim 8, wherein the firmware control synchronizes data delivery to the start of a frame.

10. The system according to claim 9, wherein packets are discarded until a frame boundary is detected.

11. The system according to claim 1, wherein data delivery is in response to a request for data from the device.

12. A method for synchronizing isochronous data delivery, comprising:
setting a synchronization indicator to a first state;
examining an isochronous packet to determine whether it contains a data marker;
if said isochronous packet does not contain said data marker, discarding said isochronous packet and repeating said examining with another isochronous packet if necessary;
if said isochronous packet contains said data marker, checking whether said synchronization indicator is set to a second state;
if said synchronization indicator is set to said second state, outputting said isochronous packet to a requesting device;
if said synchronization indicator is not set to second state, checking whether said isochronous packet corresponds to start of a frame;
if said isochronous packet corresponds to start of said frame, setting said synchronization indicator to said second state and outputting said isochronous packet to said requesting device; and
repeating said examining with another isochronous packet if necessary.

13. A method for synchronizing isochronous packets for delivery to a device, the method executing in a processing system comprising the following performed by a processor:
receiving a stream of isochronous packets;
inserting a data marker at beginning of each of said isochronous packets; and
storing said data markers and their associated isochronous packets on a storage medium in response to a request for delivery of the stored packets, synchronizing the data delivery by:
reading a data item to determine if it is a data marker;
when said data marker is identified, reading the next data item to acquire an associated isochronous header;
determining if the payload associated with said isochronous header is a frame boundary;
if said packet is not a frame boundary, discarding said packet and repeating said reading and determining steps;
if said packet is a frame boundary, deliver packet to the device.

14. The method of claim 13, further comprising:
using the data marker to synchronize data delivery to the device.

15. The method of claim 14, wherein said data delivery is synchronized in that said data delivery begins with an isochronous packet that corresponds to a frame boundary.

16. The method of claim 13, further comprising:
storing a record in a buffer in the following order: the data marker, an isochronous header, and a plurality of data items.

17. The method of claim 16, wherein the record is stored on a hard disk.

18. The method of claim 17, further comprising transferring at least one record from said hard disk to said buffer prior to said reading and determining steps.

19. The method of claim 18, wherein the packet is synchronized to the start of a frame by selectively discarding packets in said record until a frame boundary is detected.

20. The method of claim 18 further comprising:
detecting a corrupted packet;
discarding subsequent data packets until a marker is detected; and
repeating said reading, determining, discarding and delivering steps.

21. The method of claim 13 further comprising:
detecting a corrupted packet;
discarding subsequent data packets until a marker is detected; and
repeating said reading, determining, discarding and delivering steps.

* * * * *